A. ANABLE.
Corn-Planter.
No. 26,642.  Patented Jan. 3, 1860.
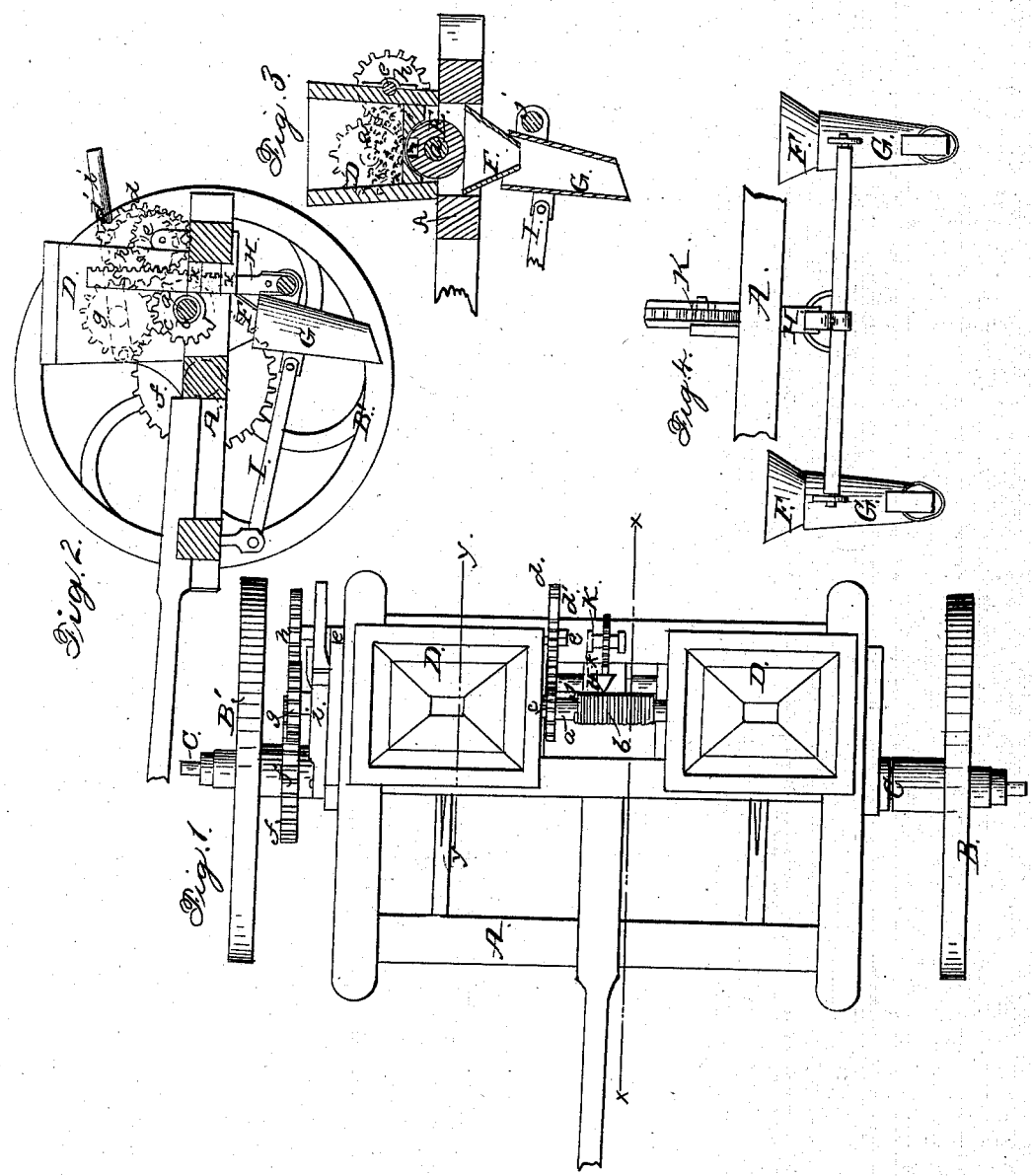
WITNESSES.
Eli Foote
F. C. Hawly
INVENTOR:
Alexander Anable

UNITED STATES PATENT OFFICE.

ALEXANDER ANABLE, OF MIDDLESEX, NEW YORK.

IMPROVEMENT IN CORN-PLANTERS.

Specification forming part of Letters Patent No. 26,642, dated January 3, 1860.

*To all whom it may concern:*

Be it known that I, ALEXANDER ANABLE, of Middlesex, in the county of Yates and State of New York, have invented a new and Improved Corn-Planter; and I do hereby declare that the following is a full, clear, and exact description of the same, reference being had to the annexed drawings, making a part of this specification, in which—

Figure 1 represents a plan or top view of my invention. Fig. 2 is a transverse vertical section of the same, the line $x\ x$, Fig. 1, indicating the plane of section. Fig. 3 is a similar section of the hopper-box, taken in the line indicated by the line $y\ y$, Fig. 1; and Fig. 4 is a back view of the dropping-tubes.

Similar letters in the several figures indicate corresponding parts.

To enable those skilled in the art to make and use my invention, I will proceed to describe it.

A frame, A, is supported by two wheels, B B', which operate on separate axles, C.

On the top of the frame, and arranged in the usual manner, are the hopper-boxes D, from which the seed is discharged by seed-dropping rollers E, that are secured to a shaft, $a$, which extends under the whole length of the frame A. One of the dropping-rollers is represented in Fig. 3, in section, in a position ready to receive seed. A spring, $b$, is secured to the shaft $a$ in such a manner that the seed-cells of the dropping-rollers are turned down, and a toothed cam, $c$, is firmly attached to said shaft, which serves to bring the dropping-rollers to a position as shown in Fig. 3. The cam is actuated by a cog-wheel, $d$, which is secured to a small shaft, $e$, on the back of one of the hopper-boxes, and to which motion is imparted from a wheel, $f$, on the hub of the driving-wheel B', and by means of intermediate cog-wheels, $g$ and $h$. The cog-wheel $g$ is attached to a lever, $i$, so that it can be raised, whereby the dropping apparatus is thrown out of gear. The cog-wheel $d$ has its teeth cut away on two or more planes forming intermediate spaces, $d'$, so that the cam $c$, together with the shaft $a$ and dropping-rollers, is allowed to fly back by the action of the spring $b$ whenever one of the intermediate spaces, $d'$, comes opposite to the cam. By these means a continuous rotary motion can be given to the cog-wheel $d$, and still the dropping-rollers are caused to receive seed and discharge the same at the proper intervals. From the dropping-rollers the seed is discharged into conical receivers F, that are placed in the top of the dropping-tubes G. The lower end of these tubes forms a hoe in the usual manner, and they are secured to a shaft, $j$, that is hinged to a toothed rack, H, in such a manner that either end of the same can be raised quite easily, and the position of the hoes is further strengthened by hinged bars I. When one of the hoes comes in contact with an obstruction, it passes over it quite readily. The toothed rack H slides up and down in guides $k$, that are secured to one of the cross-timbers of the frame A, and a pinion, K, serves to raise and lower said rack, together with the shaft $j$ and hoes or dropping-tubes G.

Having thus fully described my invention, what I claim as new, and desire to secure by Letters Patent, is—

The arrangement of the cog-wheel $d$ with intermediate spaces, $d'$, in combination with the cam $c$, spring $b$, and seed-dropping rollers E, substantially as and for the purpose specified.

ALEXANDER ANABLE.

Witnesses:
ELI FOOTE,
F. C. HAWLY.